United States Patent
Molter et al.

(10) Patent No.: US 9,033,652 B2
(45) Date of Patent: May 19, 2015

(54) METHOD AND APPARATUS FOR COOLING GAS TURBINE ROTOR BLADES

(75) Inventors: Steve Mark Molter, Cincinnati, OH (US); Steven Robert Brassfield, Cincinnati, OH (US); Richard William Jendrix, Liberty Township, OH (US); Cory Michael Williams, Maineville, OH (US); Renee Solomon Wenstrup, Cincinnati, OH (US); Mark Willard Marusko, Springboro, OH (US); Mark Edward Stegemiller, Franklin, OH (US)

(73) Assignee: General Electric Company, Schenectady, NY (US)

( * ) Notice: Subject to any disclaimer, the term of this patent is extended or adjusted under 35 U.S.C. 154(b) by 892 days.

(21) Appl. No.: 13/250,345

(22) Filed: Sep. 30, 2011

(65) Prior Publication Data

US 2013/0081408 A1 Apr. 4, 2013

(51) Int. Cl.
*F01D 5/18* (2006.01)

(52) U.S. Cl.
CPC .......... *F01D 5/187* (2013.01); *F05D 2260/201* (2013.01); *F05D 2260/202* (2013.01); *Y02T 50/676* (2013.01)

(58) Field of Classification Search
USPC .................. 415/115; 416/95, 96 R, 97 R
See application file for complete search history.

(56) References Cited

U.S. PATENT DOCUMENTS

| | | | |
|---|---|---|---|
| 4,270,883 A | 6/1981 | Corrigan | |
| 5,484,258 A | 1/1996 | Isburgh et al. | |
| 5,702,232 A | 12/1997 | Moore | |
| 5,931,638 A | 8/1999 | Krause et al. | |
| 6,036,441 A | 3/2000 | Manning et al. | |
| 6,431,832 B1* | 8/2002 | Glezer et al. ................. | 416/97 R |
| 6,705,836 B2 | 3/2004 | Bourriaud et al. | |
| 7,097,426 B2 | 8/2006 | Lee et al. | |
| 7,296,973 B2 | 11/2007 | Lee et al. | |
| 7,303,376 B2 | 12/2007 | Liang | |
| 7,377,746 B2 | 5/2008 | Brassfield et al. | |
| 7,413,407 B2* | 8/2008 | Liang .......................... | 416/97 R |
| 7,624,787 B2 | 12/2009 | Lee et al. | |
| 7,766,618 B1 | 8/2010 | Liang | |
| 7,901,183 B1 | 3/2011 | Liang | |
| 7,938,168 B2 | 5/2011 | Lee et al. | |

(Continued)

FOREIGN PATENT DOCUMENTS

EP 916810 B1 2/2006

OTHER PUBLICATIONS

International Search Report and Written Opinion issued in connection with corresponding PCT Application No. PCT/US2012/054563 dated Nov. 30, 2012.

Unofficial English translation of Office Action issued in connection with corresponding CN Application No. 201280047834.7 on Jan. 22, 2015.

*Primary Examiner* — Richard Edgar
(74) *Attorney, Agent, or Firm* — General Electric Company; William Scott Andes

(57) ABSTRACT

An airfoil for a gas turbine engine includes a first sidewall and a second sidewall coupled together at a leading edge and a trailing edge, such that a cavity is defined therebetween. A plurality of cooling circuits are defined within the cavity. Each cooling circuit channels cooling fluid through at least one cooling chamber to facilitate cooling the airfoil. More specifically, a cascade impingement circuit, a down pass circuit, a flag tip circuit, and a trailing edge circuit are provided. The cascade impingement circuit includes a central chamber and a plurality of impingement chambers.

17 Claims, 3 Drawing Sheets

(56) References Cited

U.S. PATENT DOCUMENTS

| | | |
|---|---|---|
| 7,950,903 B1 | 5/2011 | Liang |
| 7,976,277 B2 | 7/2011 | Kopmels et al. |
| 8,016,564 B1 | 9/2011 | Liang |
| 2005/0084370 A1 | 4/2005 | Gross |
| 2006/0222494 A1 | 10/2006 | Liang |
| 2010/0104419 A1 | 4/2010 | Liang |
| 2010/0166564 A1 | 7/2010 | Benjamin et al. |
| 2010/0221123 A1 | 9/2010 | Pal et al. |

* cited by examiner

METHOD AND APPARATUS FOR COOLING GAS TURBINE ROTOR BLADES

BACKGROUND OF THE INVENTION

This invention relates generally to gas turbine engines and more particularly, to methods and apparatus for cooling gas turbine engine rotor assemblies.

Turbine rotor assemblies typically include at least one row of circumferentially-spaced rotor blades. Each rotor blade includes an airfoil that includes a pressure side, and a suction side connected together at leading and trailing edges. Each airfoil extends radially outward from a rotor blade platform. Each rotor blade also includes a dovetail that extends radially inward from a shank extending between the platform and the dovetail. The dovetail is used to mount the rotor blade within the rotor assembly to a rotor disk or spool. Known blades are hollow such that an internal cooling cavity is defined at least partially by the airfoil, platform, shank, and dovetail.

To facilitate preventing damage to the airfoils from exposure to high temperature combustion gases, known airfoils include an internal cooling circuit which channels cooling fluid through the airfoil. At least some known high pressure turbine blades include an internal cooling cavity that is serpentine such that a path of cooling gas is channeled radially outward to the blade tip where the flow reverses direction and flows back radially inwardly toward the blade root. The flow may exit the blade through the root or the flow may be directed to holes in the trailing edge to permit the gas to flow across a surface of the trailing edge for cooling the trailing edge. Specifically, at least some known rotor blades channel compressor bleed air into a cavity defined between the sidewalls, to convectively cool the sidewalls. Additional cooling can be accomplished using impingement cooling wherein impingement inserts channel cooling fluid through impingement jet arrays against the inner surface of the airfoil's leading edge to facilitate cooling the airfoil along the leading edge. However, these circuits, limited by manufacturing constraints, are inefficient as the circuits channel the cooling fluid through the center of the cavity where it is ineffective in removing heat from the walls of the airfoil.

BRIEF DESCRIPTION OF THE INVENTION

In one embodiment, an airfoil for a gas turbine engine is provided. The airfoil includes a first sidewall and a second sidewall coupled together at a leading edge and a trailing edge, such that a cavity is defined therebetween. A first cooling circuit is defined within the cavity, and the first cooling circuit comprises a central chamber and at least one impingement chamber. The central chamber is in flow communication with at least one impingement chamber. A second cooling circuit is defined within the cavity, and comprises the central chamber and at least one down pass chamber. The central chamber is in flow communication with at least one down pass chamber via a channel defined near a tip of the airfoil.

In another embodiment, a gas turbine engine assembly comprising a compressor, a combustor, and a turbine coupled to the compressor is provided. The turbine comprises an airfoil that includes a first sidewall and a second sidewall coupled together at a leading edge and a trailing edge, such that a cavity is defined therebetween. A first cooling circuit is defined within the cavity, and the first cooling circuit comprises a central chamber and at least one impingement chamber. The central chamber is in flow communication with at least one impingement chamber. A second cooling circuit is defined within the cavity, and comprises the central chamber and at least one down pass chamber. The central chamber is in flow communication with at least one down pass chamber via a channel defined near a tip of the airfoil.

In yet another embodiment, a method of fabricating a rotor blade for a gas turbine engine is provided wherein the rotor blade includes an airfoil having a first sidewall and a second sidewall connected together at a leading edge and a trailing edge, such that a cavity is formed therebetween. The method includes forming a first cooling circuit within the cavity, wherein the first cooling circuit includes a central chamber and at least one impingement chamber that is coupled to the central chamber, and forming a second cooling circuit within the cavity, wherein the second cooling circuit includes the central chamber and at least one down pass chamber that is coupled to the central chamber.

DETAILED DESCRIPTION OF THE INVENTION

Figure 1:
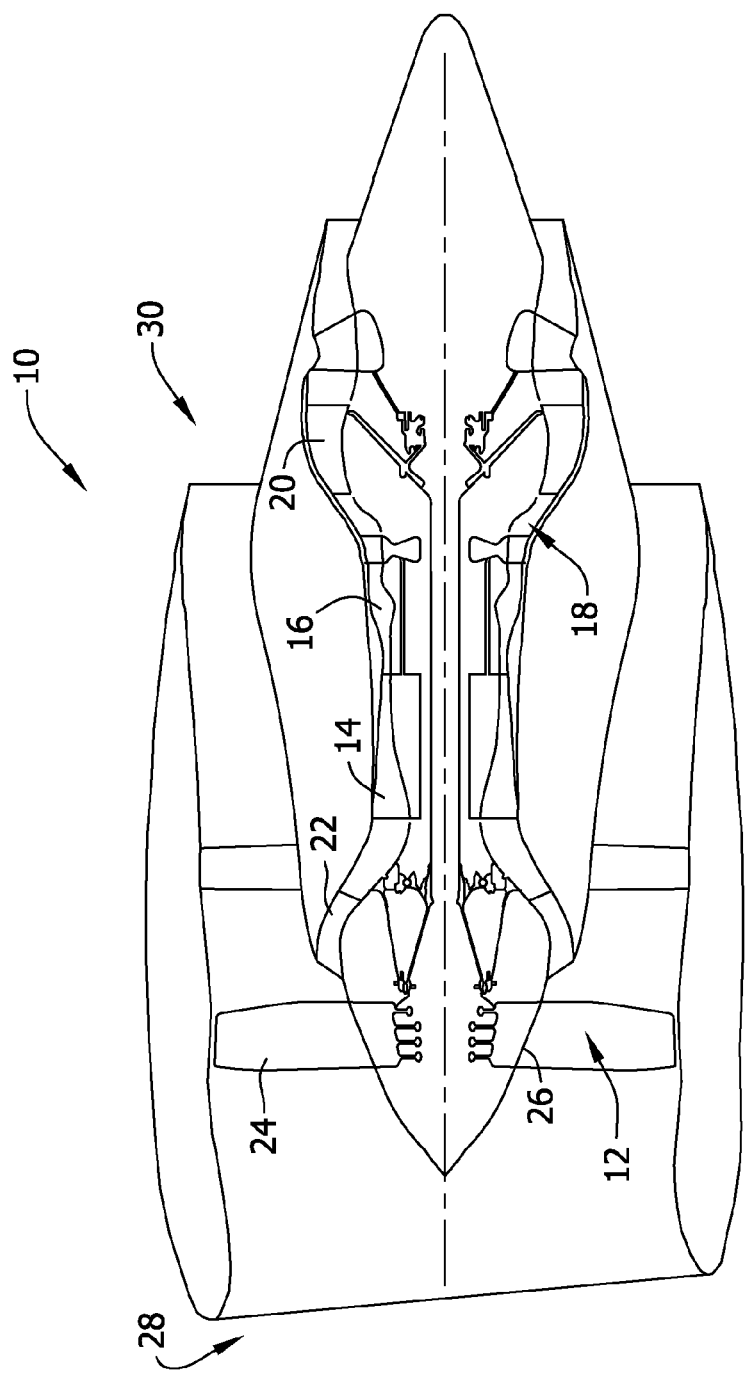
FIG. 1 is a schematic illustration of an exemplary gas turbine engine.

FIG. 1 is a schematic illustration of a gas turbine engine 10 including a fan assembly 12, a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30. In one embodiment, engine 10 is a CT7 engine commercially available from General Electric Aircraft Engines, Cincinnati, Ohio.

In operation, air flows through fan assembly 12 and compressed air is supplied to high pressure compressor 14. The highly compressed air is delivered to combustor 16. Airflow (not shown in FIG. 1) from combustor 16 drives turbines 18 and 20, and turbine 20 drives fan assembly 12.

Figure 2:
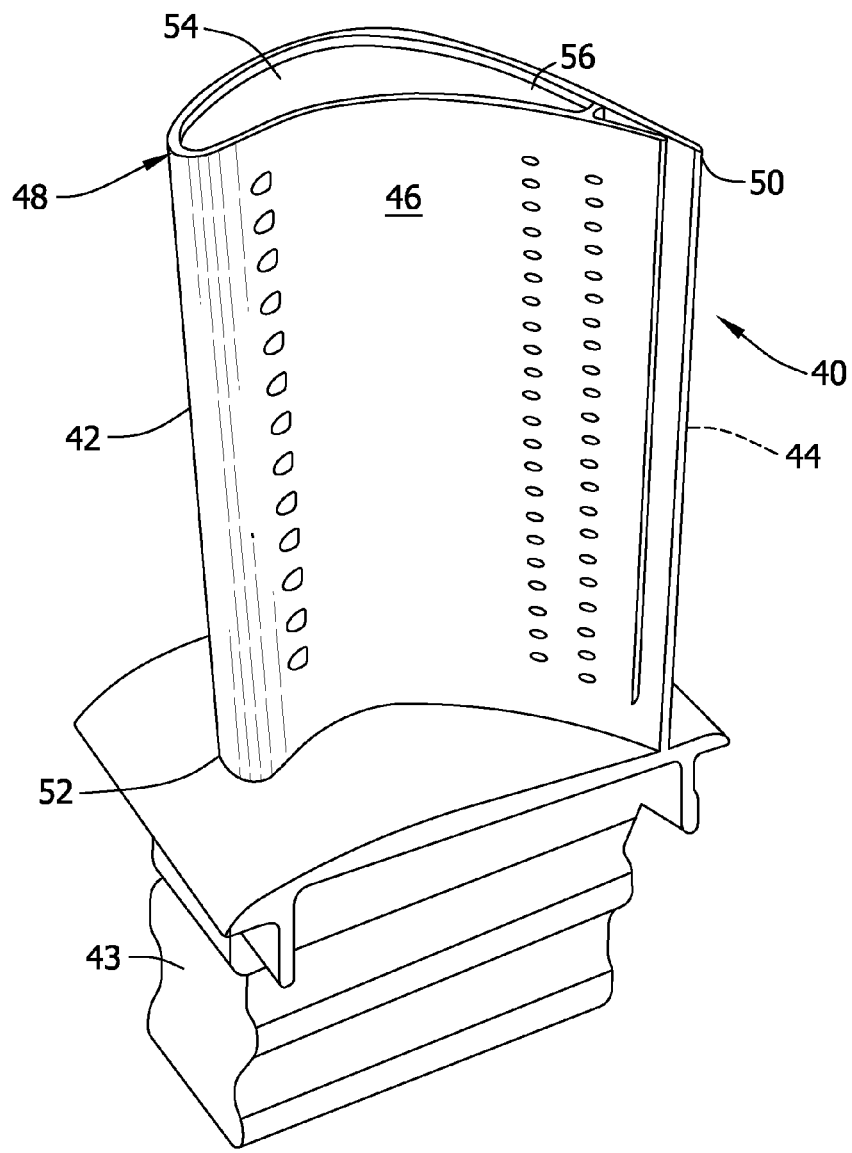
FIG. 2 is a perspective view of an exemplary rotor blade that may be used with the gas turbine shown in FIG. 1.
Figure 3:
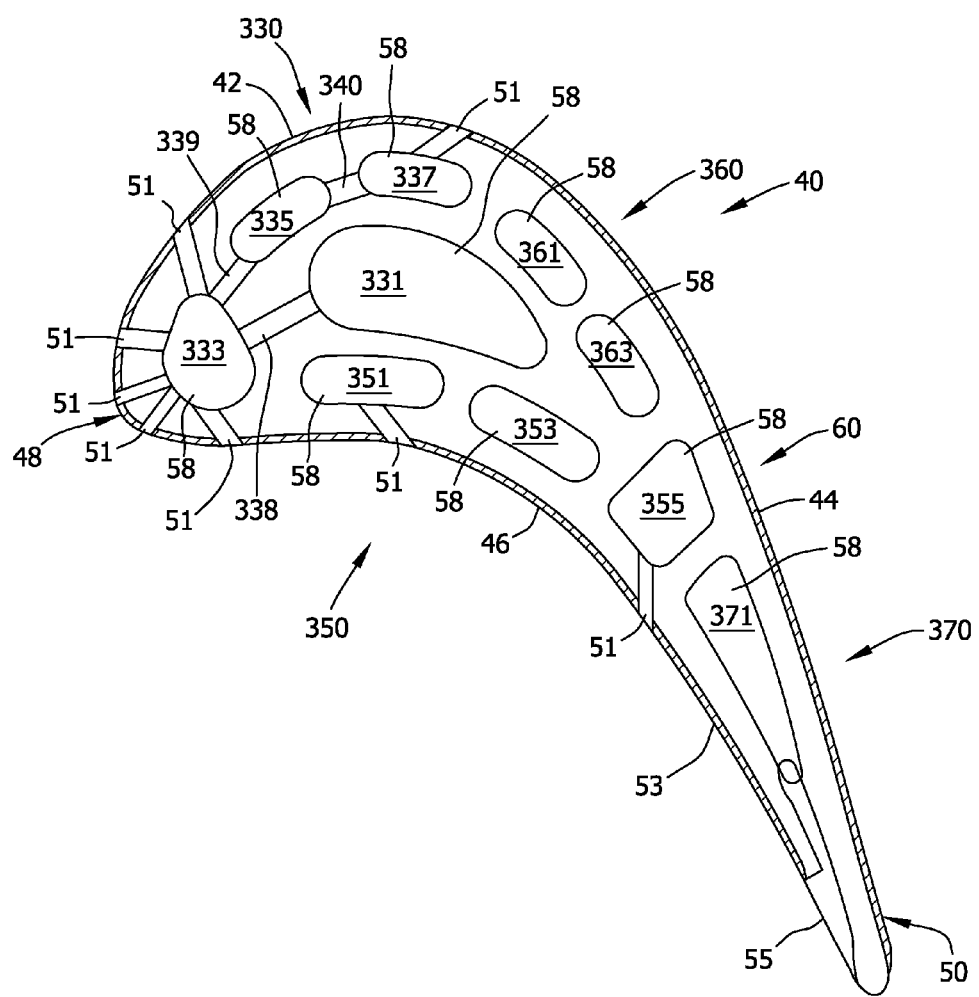
FIG. 3 is a cross-sectional view of the rotor blade shown in FIG. 2.

FIG. 2 is a perspective view of a rotor blade 40 that may be used with gas turbine engine 10 (shown in FIG. 1). FIG. 3 is a cross-sectional view of rotor blade 40. In one embodiment, a plurality of rotor blades 40 form a high pressure turbine rotor blade stage (not shown) of gas turbine engine 10. Each rotor blade 40 includes a hollow airfoil 42 and an integral dovetail 43 used for mounting airfoil 42 to a rotor disk (not shown) in a known manner.

Airfoil 42 includes a first sidewall 44 and a second sidewall 46. First sidewall 44 is convex and defines a suction side of airfoil 42, and second sidewall 46 is concave and defines a pressure side of airfoil 42. Sidewalls 44 and 46 are connected together at a leading edge 48 and at an axially-spaced trailing edge 50 of airfoil 42 that is downstream from leading edge 48. Airfoil 42 includes a plurality of film holes 51 that are spaced radially along sidewalls 44 and 46 and between an airfoil tip 54 and a blade root 52 for discharging cooling fluid from airfoil 42 to facilitate cooling an outer surface 53 of airfoil 42. Airfoil 42 also includes a plurality of trailing edge slots 55 spaced radially between airfoil tip 54 and blade root 52 along trailing edge 50 for discharging cooling fluid from airfoil 42 to facilitate cooling airfoil trailing edge 50. Heat transfer enhanced by film holes 51 and trailing edge slots 55 facilitates cooling along airfoil outer surface 53.

First and second sidewalls 44 and 46, respectively, extend radially from blade root 52 positioned adjacent dovetail 43 to airfoil tip 54 which defines a radially outer boundary of an internal cavity 56. Cavity 56 is defined within airfoil 42 between sidewalls 44 and 46. In the exemplary embodiment, cavity 56 is divided into a plurality of cooling chambers 58 which form cooling circuits 60 that target specific areas of airfoil 42. In the exemplary embodiment, three cooling circuits 60 are provided. Specifically, in the exemplary embodiment, cooling circuits 60 include a cascade impingement cooling circuit 330, a down pass circuit 350, a flag tip circuit 360, and a trailing edge cooling circuit 370. In an alternative embodiment, airfoil 42 has more or less than four cooling circuits 60.

Cascade impingement cooling circuit 330 includes a central chamber 331, a leading edge chamber 333, a first cascade impingement chamber 335, and a second cascade impingement chamber 337. Chambers 331, 333, 335, and 337 extend radially from blade root 52 to airfoil tip 54. Alternatively, chambers 331, 333, 335, and 337 extend along a portion of airfoil 42 from blade root 52 to airfoil tip 54. Central chamber 331 is in flow communication with a first cooling fluid source (not shown) located within engine 10. Central chamber 331 is coupled to leading edge chamber 333 via one or more holes 338 spaced from blade root 52 to airfoil tip 54 and aligned in a row. Leading edge chamber 333 is coupled to at least one row of film holes 51 that extends radially, and each hole 51 extends from chamber 333 to outer surface 53. In the exemplary embodiment, chamber 333 is coupled to five rows of film holes 51. Alternatively, chamber 333 may be coupled to any number of film holes 51 or rows of film holes 51 that enables airfoil 42 to function as described herein.

Leading edge chamber 333 is coupled to first cascade impingement chamber 335 via one or more holes 339 spaced from blade root 52 to airfoil tip 54 and aligned in a row. First cascade impingement chamber 335 is coupled to second cascade impingement chamber 337 via one or more holes 340. Second cascade impingement chamber 337 is coupled to at least one row of film holes 51 that extends radially, and each hole 51 extends from chamber 337 to outer surface 53.

Down pass circuit 350 includes central chamber 331, a first down pass chamber 351, a second down pass chamber 353, and an up pass chamber 355. Chambers 351, 353, and 355 extend radially from blade root 52 to airfoil tip 54. Alternatively, chambers 351, 353, and 355 extend along a portion of airfoil 42 from blade root 52 to airfoil tip 54. Central chamber 331 is coupled (not shown) with chambers 351 and 353 at or near airfoil tip 54. More specifically, chambers 331, 351, and 353 are configured to substantially reverse the flow direction of at least a portion of the cooling fluid within chamber 331 at or near airfoil tip 54 such that the flow is split between chambers 351 and 353 and channeled via chambers 351 and 353 toward blade root 52. Chambers 351 and 353 are coupled (not shown) with chamber 355 at or near blade root 52. More specifically, chambers 351, 353, and 355 are configured to substantially reverse the flow direction of at least a portion of the cooling fluid within chambers 351 and 353 at or near blade root 52 such that the flow from chambers 351 and 353 is combined and channeled via chamber 355 toward airfoil tip 54. Chambers 351 and 355 are coupled to at least one row of film holes 51 that extends radially, and each hole 51 extends, respectively, from chambers 351 and 355 to outer surface 53. Alternatively, one or more chambers 351, 353, and 355 are coupled to film holes 51.

Flag tip circuit 360 includes a first flag tip chamber 361 and a second flag tip chamber 363. Chambers 361 and 363 extend radially from blade root 52 to airfoil tip 54. Alternatively, chambers 361 and 363 extend along a portion of airfoil 42 from blade root 52 to airfoil tip 54. Chambers 361 and 363 are in flow communication with a second cooling fluid source (not shown) located within engine 10. First and second cooling fluid sources may be coupled upstream or may be the same source. Chambers 361 and 363 are coupled to an axially flowing chamber (not shown) near the tip 54. The axially flowing chamber facilitates discharging cooling fluid from chambers 361 and 363 to trailing edge cooling slots 55 and an outer surface of airfoil sidewall 44. The axially flowing chamber is at least partially positioned adjacent to second sidewall 46. Alternatively, the axially flowing chamber may be positioned such that chambers 355 and 371 (described below) substantially isolate the axially flowing chamber from second sidewall 46. Moreover, the axially flowing chamber may be of any geometry or position that enables airfoil 41 to function as described herein.

Trailing edge cooling circuit 370 includes a trailing edge chamber 371 and trailing edge cooling slots 55. Chamber 371 extends radially from blade root 52 to airfoil tip 54. Alternatively, chamber 371 extends along a portion of airfoil 42 from blade root 52 to airfoil tip 54. Circuit 370 is any known or conventional cooling circuit. Chamber 371 is coupled with cooling slots 55. Chamber 371 may be coupled with the first, the second, and/or a third cooling fluid source.

During operation, a cooling fluid, typically air, from the first cooling fluid source is channeled to central chamber 331 and flag tip chambers 361 and 363. Cooling fluid flows through central chamber 331 from blade root 52 toward airfoil tip 54 and impinges directly into leading edge chamber 333 via holes 338. A portion of the fluid in leading edge chamber 333 is discharged through film holes 51, and the remainder of the fluid in leading edge chamber 333 is impinged into first cascade impingement chamber 335. Fluid in first cascade impingement chamber 335 then impinges into second cascade impingement chamber 337 before exiting the airfoil 42 through film holes 51.

A portion of the fluid flowing through central chamber 331 reaches tip 54 where the fluid is channeled back toward blade root 52 through first and second down pass chambers 351 and 353. A portion of the fluid in first down pass chamber 351 is discharged through film holes 51. The fluid remaining in down pass chambers 351 and 353 is combined near blade root 52 and channeled through up pass chamber 355 toward airfoil tip 54. Fluid in up pass chamber 355 is discharged via film holes 51. It should be appreciated that the fluid flowing radially through central chamber 331 from root 52 to tip 54 is insulated by the other chambers and passageways surrounding central chamber 331, such that the fluid within chamber 331 is kept cooler than is generally possible in known cooled turbine blades.

Cooling fluid from the first cooling fluid source is channeled to flag tip chambers 361 and 363. Alternatively, cooling fluid may be channeled to chambers 361 and 363 from the second fluid source. Cooling fluid flows radially through chambers 361 and 363 from root 52 to tip 54. At the tip 54, cooling fluid is discharged from chambers 361 and 363 to outer surface 53 and cooling slots 55 via the axially flowing chamber located near tip 54.

The above-described rotor blade is cost-effective and highly reliable. The rotor blade includes an airfoil having a number of cooling circuits which target cooling on the leading edge, pressure side, and suction side of the airfoil. A number of cooling techniques are employed to cool the exterior sidewalls of the airfoil, such as impingement cooling and near-wall cooling. The arrangement of the various chambers within the cooling circuits facilitates isolation and insulation of cooling fluid, further facilitating cooling of the airfoil as a result of cooler cooling fluid passing through the various chambers. Such an arrangement is made possible by advances in fabrication techniques, including, but not limited to, rapid prototyping of ceramic cores. More specifically, traditional cooling schemes are limited by manufacturing constraints related to the manufacture of ceramic cores used to create the passageways and chambers within cooling circuits. New core production processes reduce such constraints imposed by hard tooling and enable the core to take new shapes and sizes. As a result, cooler operating temperatures within the rotor blade facilitate extending a useful life of the rotor blades in a cost-effective and reliable manner.

While the invention has been described in terms of various specific embodiments, those skilled in the art will recognize that the invention can be practiced with modification within the spirit and scope of the claims.

What is claimed is:

1. An airfoil for a gas turbine engine, said airfoil comprising:
   a first sidewall and a second sidewall coupled together at a leading edge and a trailing edge, such that a cavity is defined therebetween;
   a first cooling circuit defined within said cavity, said first cooling circuit comprising a central chamber and at least one impingement chamber having a leading edge chamber, a first cascade impingement chamber, and a second cascade impingement chamber, said central chamber in flow communication with said at least one impingement chamber; and
   a second cooling circuit defined within said cavity, said second cooling circuit comprising said central chamber and at least one down pass chamber, said central chamber in flow communication with said at least one down pass chamber via a channel defined near a tip of said airfoil.

2. An airfoil in accordance with claim 1 further comprising a third cooling circuit defined within said cavity, said third cooling circuit comprising at least one flag tip chamber, said at least one flag tip chamber in flow communication with an axially flowing chamber in flow communication with at least one trailing edge cooling slot.

3. An airfoil in accordance with claim 1 wherein said leading edge chamber is in flow communication with said central chamber via a first radially extending row of openings, said first cascade impingement chamber is in flow communication with said leading edge chamber via a second radially extending row of openings, and said second cascade impingement chamber is in flow communication with said first cascade impingement chamber via a third radially extending row of openings.

4. An airfoil in accordance with claim 3 wherein said second cascade impingement chamber is in flow communication with a radially extending row of film holes.

5. An airfoil in accordance with claim 1 wherein said at least one down pass chamber comprises a first down pass chamber, a second down pass chamber, and an up pass chamber.

6. An airfoil for a gas turbine engine, said airfoil comprising:
   a first sidewall and a second sidewall coupled together at a leading edge and a trailing edge, such that a cavity is defined therebetween;
   a first cooling circuit defined within said cavity, said first cooling circuit comprising a central chamber and at least one impingement chamber, said central chamber in flow communication with said at least one impingement chamber; and
   a second cooling circuit defined within said cavity, said second cooling circuit comprising said central chamber and at least one down pass chamber, said central chamber in flow communication with said at least one down pass chamber via a channel defined near a tip of said airfoil, said at least one down pass chamber including a first down pass chamber, a second down pass chamber, and an up pass chamber, wherein said first and second down pass chambers are in flow communication with said central chamber, and said first and second down pass chambers are in flow communication with said up pass chamber.

7. A gas turbine engine assembly comprising:
   a compressor;
   a combustor; and
   a turbine coupled to said compressor, said turbine comprising an airfoil, said airfoil comprising:
   a first sidewall and a second sidewall coupled together at a leading edge and a trailing edge, such that a cavity is defined therebetween;
   a first cooling circuit defined within said cavity, said first cooling circuit comprising a central chamber and at least one impingement chamber having a leading edge chamber, a first cascade impingement chamber, and a second cascade impingement chamber, said central chamber in flow communication with said at least one impingement chamber; and
   a second cooling circuit defined within said cavity, said second cooling circuit comprising said central chamber and at least one down pass chamber, said central chamber in flow communication with said at least one down pass chamber via a channel defined near a tip of said airfoil.

8. A gas turbine engine assembly in accordance with claim 7 further comprising a third cooling circuit defined within said cavity, said third cooling circuit comprising at least one flag tip chamber, said at least one flag tip chamber in flow communication with an axially flowing chamber in flow communication with a trailing edge cooling slot.

9. A gas turbine engine assembly in accordance with claim 7 wherein said leading edge chamber is in flow communication with said central chamber via a first radially extending row of openings, said first cascade impingement chamber is in flow communication with said leading edge chamber via a second radially extending row of openings, and said second cascade impingement chamber is in flow communication with said first cascade impingement chamber via a third radially extending row of openings.

10. A gas turbine engine assembly in accordance with claim 9 wherein said second cascade impingement chamber is in flow communication with a radially extending row of film holes.

11. A gas turbine engine assembly in accordance with claim 7 wherein said at least one down pass chamber comprises a first down pass chamber, a second down pass chamber, and an up pass chamber.

12. A gas turbine engine assembly comprising:
   a compressor;
   a combustor; and
   a turbine coupled to said compressor, said turbine comprising an airfoil, said airfoil comprising:
   a first sidewall and a second sidewall coupled together at a leading edge and a trailing edge, such that a cavity is defined therebetween;
   a first cooling circuit defined within said cavity, said first cooling circuit comprising a central chamber and at least one impingement chamber, said central chamber in flow communication with said at least one impingement chamber; and a second cooling circuit defined within said cavity, said second cooling circuit comprising said central chamber and at least one down pass chamber, said central chamber in flow communication with said at least one down pass chamber via a channel defined near a tip of said airfoil, said at least one down pass chamber including a first down pass chamber, a second down pass chamber, and an up pass chamber, wherein said first and second down pass chambers are in flow communication with said central chamber, and said first and second down pass chambers are in flow communication with said up pass chamber.

13. A method of fabricating a rotor blade for a gas turbine engine, wherein the rotor blade includes an airfoil having a first sidewall and a second sidewall connected together at a leading edge and a trailing edge, such that a cavity is formed therebetween, said method comprising:

forming a first cooling circuit within the cavity, wherein the first cooling circuit includes a central chamber and at least one impingement chamber that is coupled to the central chamber, wherein forming includes coupling a leading edge chamber, a first cascade impingement chamber, and a second cascade impingement chamber with the central chamber;

forming a second cooling circuit within the cavity, wherein the second cooling circuit includes the central chamber and at least one down pass chamber that is coupled to the central chamber.

14. A method in accordance with claim 13 further comprising forming a third cooling circuit within the cavity, wherein the third cooling circuit includes at least one flag tip chamber that is in flow communication with an axially flowing chamber in flow communication with a trailing edge cooling slot.

15. A method in accordance with claim 13 further comprising:

forming a first radially extending row of openings between the central chamber and the leading edge chamber;

forming a second radially extending row of openings between the leading edge chamber and the first cascade impingement chamber; and forming a third radially extending row of openings between the first cascade impingement chamber and the second cascade impingement chamber.

16. A method in accordance with claim 15 further comprising forming a radially extending row of film holes coupled to the second cascade impingement chamber.

17. A method of fabricating a rotor blade for a gas turbine engine, wherein the rotor blade includes an airfoil having a first sidewall and a second sidewall connected together at a leading edge and a trailing edge, such that a cavity is formed therebetween, said method comprising:

forming a first cooling circuit within the cavity, wherein the first cooling circuit includes a central chamber and at least one impingement chamber that is coupled to the central chamber;

forming a second cooling circuit within the cavity, wherein the second cooling circuit includes the central chamber and at least one down pass chamber that is coupled to the central chamber, wherein forming includes forming a first and second down pass chamber that are coupled together with the central chamber.

* * * * *